United States Patent
Caven

(12) 
(10) Patent No.: US 11,003,903 B2
(45) Date of Patent: May 11, 2021

(54) METHOD OF FORMATTING SEWING PATTERNS FOR PAPERLESS USE

(71) Applicant: JO-ANN STORES, LLC, Hudson, OH (US)

(72) Inventor: Elizabeth Caven, Minnetonka, MN (US)

(73) Assignee: JO-ANN STORES, LLC, Hudson, OH (US)

(*) Notice: Subject to any disclaimer, the term of this patent is extended or adjusted under 35 U.S.C. 154(b) by 29 days.

(21) Appl. No.: 16/350,932

(22) Filed: Feb. 1, 2019

(65) Prior Publication Data

US 2020/0250421 A1    Aug. 6, 2020
US 2020/0410233 A9    Dec. 31, 2020

Related U.S. Application Data

(60) Provisional application No. 62/625,838, filed on Feb. 2, 2018.

(51) Int. Cl.
| | | |
|---|---|---|
| G06K 9/00 | (2006.01) |
| G06F 30/00 | (2020.01) |
| G06T 7/62 | (2017.01) |
| G06F 113/12 | (2020.01) |

(52) U.S. Cl.
CPC ......... *G06K 9/00496* (2013.01); *G06F 30/00* (2020.01); *G06T 7/62* (2017.01); *G06F 2113/12* (2020.01)

(58) Field of Classification Search
CPC ........ G06K 9/00496; G06T 7/62; G06F 30/00
USPC .......................................................... 382/111
See application file for complete search history.

(56) References Cited

U.S. PATENT DOCUMENTS

| | | |
|---|---|---|
| 5,195,451 A | 3/1993 | Nakashima |
| 6,173,211 B1 | 1/2001 | Williams et al. |
| 7,716,143 B2 | 5/2010 | Shemula |
| 2013/0049938 A1* | 2/2013 | Hooke ................. G08C 17/02 340/12.5 |
| 2016/0183617 A1 | 6/2016 | Mckinney |

* cited by examiner

*Primary Examiner* — Stephen P Coleman
(74) *Attorney, Agent, or Firm* — Hahn Loeser & Parks, LLP; Daniel J. Smola

(57) ABSTRACT

The present invention is a method of using a computer to programmatically format an existing sewing pattern for the home sewist so that the pattern, which represents a template, can be used without paper. This invention facilitates the readiness of the pattern for the home sewist's use without paper to save time as well as reduce the physical storage space required and eliminate the paper waste typically created with each new pattern.

7 Claims, 1 Drawing Sheet

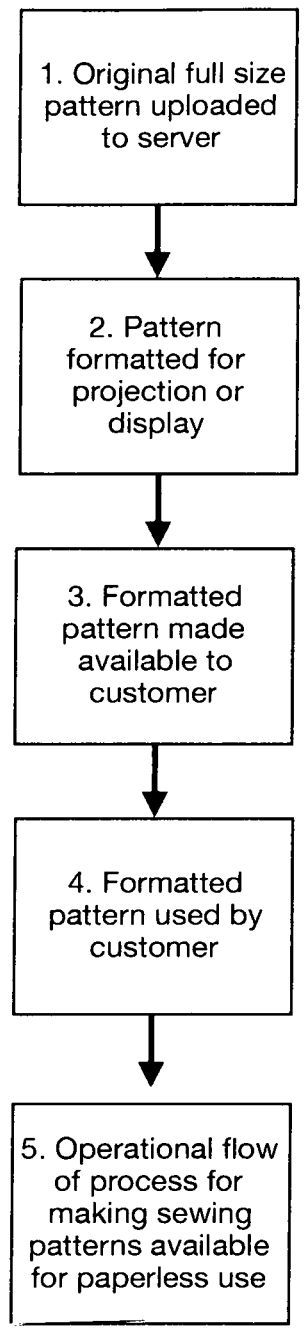

METHOD OF FORMATTING SEWING PATTERNS FOR PAPERLESS USE

The present application claims priority to the earlier filed provisional application having No. 62/625,838 filed on Feb. 2, 2018, and hereby incorporates subject matter of the provisional application in its entirety.

FIELD OF THE INVENTION

This invention relates in general to systems and methods for formatting a sewing pattern, which acts as a template for cutting fabric for making garments, bags, toys, and the like. The present invention deals more particularly with methods for formatting pattern pieces of pre-determined configurations by detecting their original file type, then programmatically arranging them with the proper dimension and layout needed with respect to the size of the digital screen and the boundary of the device being used to project the image of the pattern pieces in light (instead of on paper as necessitated prior to this invention). The properly formatted patterns can then be sold through electronic commerce.

BACKGROUND OF THE INVENTION

Sewing patterns represent a template to be used in cutting out fabric in order to make a garment, bag, or any other sewn item. At present, the home sewist is only able to use a sewing pattern that is physically printed on tissue paper, printer paper, fabric or other physical material. Then the pattern piece(s) are pinned or placed on fabric and used as a template to aid in accurate cutting. The paper patterns themselves are a problem. They rip easily, take time to prepare for use, require physical storage or are thrown away after use, creating waste.

If a home sewist prints a sewing pattern on their home printer, the pattern pieces are split up into sections that then must be assembled by the sewist before the template is ready for use. This is very time consuming and can introduce errors into the sewing pattern if cuts are not made accurately. Paper sewing patterns purchased from a store contain lightweight paper that has been folded many times and requires extensive time be spent ironing, cutting and/or tracing before use.

The present invention does not use paper and the image of the sewing pattern piece(s) can be displayed much more quickly than a paper pattern can be made ready for use. In addition to the time saved, this invention also saves paper which in turn means less physical storage space in the home is needed and no paper waste is created with each new pattern.

This invention is directed at a method for formatting sewing patterns for use without paper so they can be made available through e-commerce to home sewists; saving them time, waste and physical storage space problems. Briefly stated, the resulting sewing patterns formatted in this method are then projected from a light source or virtual representation through a digital device.

The invention takes the input of a CAD or image file type, like a user generated photo, CAD software created file such as those from Gerber, Adobe Illustrator, or PDF formats, for example, and programmatically formats the individual template(s) found in that file into a sewing pattern product with the proper dimension and layout needed for paperless use.

SUMMARY

A method of preparing sewing patterns for paperless use is provided. A sewing pattern file is uploaded to a pattern server which then detects the characteristics of the sewing pattern and its file type. The pattern server then runs a series of logic to programmatically format the existing pattern pieces to fit the pre-determined size of the screen that will display the pattern piece to the customer and fit the pre-determined dimensions required by the projecting light source or screen. The method is characterized by the following procedure steps: An existing sewing pattern is recognized by the server (through a digital file being uploaded or image taken); the server detects the dimension of the sewing pattern piece(s); selection of logic needed to format the pattern is determined by server; the pattern is formatted using logic to fit the pre-determined boundaries of the screen or light that will be used to project the pattern image onto the fabric; and access to the pattern formatted for paperless use is provided over a network.

In some embodiments of the method the uploaded pattern is an image scanned or photographed either prior to or at the time of use where pattern boundary lines can be detected. In some embodiments of the method, the uploaded pattern is a previously created digital file like a jpg, a pdf, CAD file, or any other computer or program generated type.

In some embodiments of the method, the light source is a projector. In some embodiments, the screen is a phone, tablet, hand-held or wearable computer capable of virtually projecting the pattern through augmented reality.

DETAILED DESCRIPTION

First the original sewing pattern file must be uploaded to the pattern server, connected through a public or private network by the creator or preparer of the design (usually a designer or customer). The pattern server detects the file type and uses logic to determine the necessary adjustments that need to be made for the original pattern to fit the dimensions of the display device and to be effectively projected (through a light source or screen in the case of augmented reality) onto fabric without the need for a paper template.

The pattern server includes storage to hold the file and the logic to run a subroutine altering the original pattern file type and scaling the design appropriately to be saved in a new format usable by a projector or augmented reality screen. The pattern server programmatically formats and adjusts the pattern file as needed then makes the design available through a user interface that can be seen by the customer on a device connecting to the pattern server through a public network.

Once the file has been formatted, the customer browses the available designs and chooses a pattern from the server. The server securely displays the pattern and makes it available to the customer's projector or augmented reality display in the proper format. It should be understood that the language referred to and embodiments specifically described in these claims do not necessarily limit the applications and implementations described herein. The specific embodiments listed here for this invention provide non-exhaustive examples of implementing the invention.

This invention allows for the original sewing pattern computer file or drawing to be uploaded to a pattern server that detects the original file format and programmatically alters and scales the file so that it can be made available to customers to project virtually or through a light source onto fabric, thereby taking away the need for having the pattern printed on paper.

In this illustrative overview of the invention a server for patterns is connected to the internet and can be communicated with by vendor and customer systems. The original sewing pattern file format (which could be in a variety of standard file extensions such as pdf, jpg, or other software or hand generated format) is uploaded by the vendor or customer to the server (1).

Logic is run to determine the type of format the pattern file is in and then that format is converted into a new projectable format that, generally stated, can be scaled to fit the projection target (2). This new projectable pattern is made available to the customer over a public network (3) and the customer navigates to this public network where he/she is presented with a variety of sewing patterns from which to choose.

The customer selects the desired pattern so it can be accessed by a projector through a public or private connection and used (4). The pattern server, ideally but not necessarily, displays the pattern for the customer in a secure manner without necessitating that it be stored on the customer's computing device or on the projector itself. Once the customer has used the sewing pattern, the process instructions are displayed for the customer.

In order to make the invention there must be an understanding of the format needed by the projector and sizes which can be displayed clearly by the projector or augmented reality device. There also must be a catalog of the differences in possible input types that the original sewing pattern files will have when they are uploaded to the pattern server. The invention involves programmatically altering the original file in such a way that it can be adjusted and formatted for projection, then stored in an accessible way for the customer.

What is claimed is:

1. A method of preparing sewing patterns for paperless use by projection onto fabric using a pattern server and a network, the method comprising:
   uploading a sewing pattern file to the pattern server;
   the pattern server detecting characteristics of the sewing pattern file type and the sewing pattern;
   the pattern server selecting logic needed to format the sewing pattern for paperless use;
   the pattern server detecting a dimension of one or more pieces of the sewing pattern;
   the pattern server formatting the sewing pattern for projection or display and to fit pre-determined boundaries of a screen or light source to be used to project a pattern image onto fabric using the selected logic; and
   providing access to the formatted sewing pattern over the network.

2. A method as claimed in claim 1, wherein said uploaded pattern is an image scanned or photographed either prior to or at the time of use where pattern boundary lines can be detected.

3. A method as claimed in claim 1, wherein said uploaded pattern is a previously created digital file.

4. The method of claim 1, wherein the light source is a projector.

5. The method of claim 1, wherein the screen is a phone, tablet, handheld or wearable computer capable of virtually projecting the pattern through augmented reality.

6. The method of claim 1, wherein the step of formatting the sewing pattern for projection or display includes the step of scaling the sewing pattern.

7. The method of claim 1, wherein the uploaded pattern file comprises a full size pattern.

* * * * *